United States Patent

[11] 3,616,198

| [72] | Inventor | Kenji Saito |
| | | Fujieda-shi, Japan |
| [21] | Appl. No. | 809,203 |
| [22] | Filed | Mar. 21, 1969 |
| [45] | Patented | Oct. 26, 1971 |
| [73] | Assignee | Sumitomo Bakelite Company Limited |
| | | Tokyo, Japan |
| [32] | Priority | Mar. 26, 1968 |
| [33] | | Japan |
| [31] | | 43/19181 |

[54] PROCESS FOR PRODUCING LAMINATE
11 Claims, 2 Drawing Figs.

[52] U.S. Cl............................................................ 161/216,
161/218, 156/309, 156/327, 156/333, 156/306
[51] Int. Cl........................................................ B32b 15/08
[50] Field of Search............................................ 156/309;
161/214, 216, 218

[56] References Cited
UNITED STATES PATENTS

| 2,694,028 | 11/1954 | Rapp............................ | 161/216 |
| 3,054,703 | 9/1962 | Brasure........................ | 156/309 |
| 3,381,818 | 5/1968 | Cope et al..................... | 161/214 |
| 3,467,569 | 9/1969 | Weber et al. ................. | 161/216 |
| 3,481,812 | 12/1969 | Holub et al. .................. | 161/309 |

*Primary Examiner*—Reuben Epstein
*Attorney*—Karl W. Flocks

ABSTRACT: In a process for producing a laminate by assembly of metal plate and thermosetting resin-impregnated sheet by heating under pressure, improvement in that the assembly contains a peroxide and a thermoplastic polymer film being in contact with the inner surface of the metal plate, to insure the firm adhesion of the laminate, and contains additionally another thermoplastic polymer film being in contact with the outer surface of the resin-impregnated sheet during the operation but removed after the operation, to yield a mat laminate having the same excellent properties.

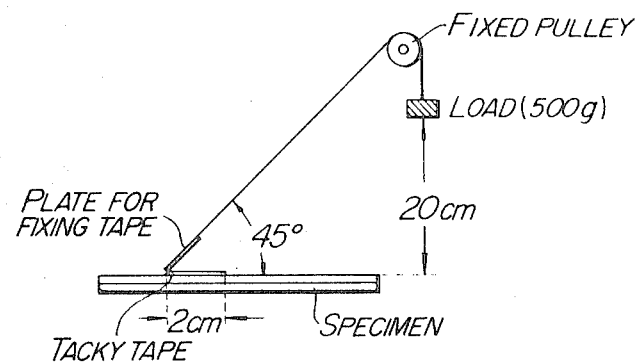
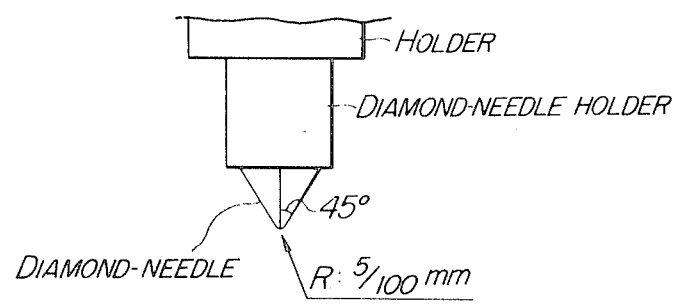

PROCESS FOR PRODUCING LAMINATE

The present invention relates to a process for producing a laminate, and more particularly to an improvement for producing a laminate of a metal support and a cured thermosetting resin layer, having a glossy or mat surface.

In adhering a thermosetting resin-impregnated sheet and a metal plate or foil to obtain a laminate thereof, there have been usually used two procedures, that is, interposing an adhesive paper impregnated with a solution of a mixture of a thermoplastic resin and the thermosetting resin between the sheet and the plate or foil, or coating the solution mixture on the plate or foil and then placing the sheet thereon, and thereafter heating in heat-expansion cases the assembly under pressure to integrate between two caul plates or rollers of a continuous processing machine to form a laminate.

The thus obtained laminate easily delaminates, this phenomenon being caused by the break of adhesion that occurred at the edges where the laminate is subjected to such processings as cutting, punching, holing and the like, due to the concentration of shear stress, this occurs because of too high a rigidity of the resin used in that it will not tolerate such stress or it is caused by heat-stress due to the difference of heat-expansion between metal and resin.

The laminate produced has a surface as glossy as a mirror. However, if a laminate having a mat surface is needed, it is necessary to use finely mat finished caul plates or rollers, or to grind the surface of the laminate so as to give it a mat finishing which scatters uniformly the reflex light, in the conventional method. In the former method, the caul plate or roller could not be reused once its surface is injured even by a slight scratch. Furthermore, a series of caul plates or rolls are necessary in the production of various mat laminates. Another drawback of the method resides in the careful handling of the caul plate or roller, and these are of very low performance and low workability. In the latter method, there are also drawbacks necessitating very troublesome procedure of processing one by one and highly delicate skill in mechanical processing for obtaining various, desired surfaces.

An object of the present invention is to provide a process for producing a laminate having an excellent adhesion being tolerable against the concentration of shear stress.

Another object of the present invention is to provide a process for producing with ease a mat decorative laminate having an optional mat pattern on the surface.

The present invention relates to a development in the process for producing a laminate from a thermosetting resin-impregnated sheet and a metal plate or foil by the conventional method above mentioned, which development comprises interposing a film of thermoplastic resin (referred hereinafter to A-film) between the thermosetting resin-impregnated sheet and the metal plate or foil, and heating under pressure the assembly to integrate while activating the A-film with a peroxide, or a mixture of a peroxide and an organic acid, a mixture of a peroxide and an anhydride, which is present in the assembly.

Furthermore, the present invention relates to a process for producing a laminate having a mat surface comprising interposing the first film of thermoplastic resin between a thermosetting resin-impregnated sheet and a metal plate or foil, putting the second film of thermoplastic resin (referred hereinafter to B-film) upon the resin-impregnated sheet, and heating under pressure the assembly to integrate while activating the first film with a peroxide, or a mixture of a peroxide and an organic acid, a mixture of a peroxide and an anhydride, which is present between the outer surface of the second film and the metal plate or foil.

The term "to integrate" or "integration" herein means that the thermosetting resin-impregnated sheet and the metal plate or foil adhere to each other tightly to become laminated into an integral structure.

The A-film used in the present invention includes the films of polyethylene, polypropylene, copolymers containing olefinic structures, polyvinylchloride and the blends of any such resin and other thermoplastic resins or a laminated composite film of the films and those of other thermoplastic resin. For the integration, the A-film should be subjected to such a condition of heating under pressure that the surface of the film melts and flows. Thus, for instance, when using a condition of heating at a temperature of 120°C. and a pressure of 10kg./cm.$^2$ for laminating unsaturated polyester resin-impregnated paper or cloth containing benzoyl peroxide as a curing agent and steel plate, the object of the present invention would be attained by the use of polyethylene film having a thickness of 40microns but hardly by the use of polypropylene film.

The peroxides or organic acids or anhydrides used therewith, in the present invention include anyone of the type which activates A-film, which is, for example, benzoyl peroxide, p-chloro-benzoyl peroxide, methyl ethyl ketone peroxide, cyclohexanone peroxide, cumen hydro-peroxide, tert.-butyl perbenzoate, di-tert.-butyl per phthalate, and tert.-butyl peracetate as the peroxide, and acrylic acid, methacrylic acid, crotonic acid, iso-crotonic acid, maleic acid, fumaric acid, cinnamic acid, benzoic acid, phthalic acid, iso-phthalic acid, pyromellitic acid, oxalic acid, succinic acid, formic acid, acetic acid, propionic acid, maleic anhydride, itaconic anhydride, cinnamic anhydride, phthalic anhydride, benzoic anhydride, tetrahydrophthalic anhydride, hexahydrophthalic anhydride, succinic anhydride and acetic anhydrid and the like as the organic and the anhydride. The activator may be used by impregnating in the thermosetting resin-impregnated sheet or by coating on the surface of the sheet, A-film, or that of the metal plate or foil which contacts with A-film. When using, as the thermosetting resin for the sheet, unsaturated polyester resin or allyl resin such as diallyl phthalate resin, diallyl isophthalate resin, diallyl maleate resin and diallyl chlorendate resin, which already contains the activator, it is not necessary to add further the activator of peroxides or the mixture of peroxides and organic acid or the mixture of peroxides and anhydrides.

It is surprising in the present invention that despite the polyolefine resin has been generally recognized difficult to be adhered to metal plate it adheres firmly thereto according to the present invention, resulting in a laminate tolerable to the concentration of the shear-stress caused by the processing such as cutting, punching and bending. Though the present invention should not be influenced by any other theories, it is believed that such a good adhesion is given by the activation of A-film caused by the activator of peroxides which decomposes during the step of heating under pressure. It is also surprising that the activation is effected probably due to the permeation of activator through the A-film even when the activator is contained in the resin-impregnated sheet. Preferably, the A-film has a thickness of less than 0.15 mm. If the thickness of A-film exceeds 0.15 mm., the permeation of the peroxide, organic acid or acid anhydride becomes insufficient and the adhesion also becomes insufficient.

According to the method mentioned above, the resultant laminates have a glossy mirror surface, because of the use of conventional caul plate or roller, and an excellent adhesion property tolerable of the concentration of shear stress caused by processing as mentioned, probable due to the toughness of the thermoplastic resin film used.

According to the present invention, a mat laminate can be made with ease following the same procedures as mentioned above with exception that a film of thermoplastic resin is put on the outside of the thermosetting resin-inpregnated sheet and peeled off after the procedures.

The B-film used in the present invention is a thermoplastic resin film available in the market, and includes polyester, polyacetal, polytetrafluoroethylene, polyethylene, polypropylene, polybutadiene, polycarbonate, polyamide, polyvinylchloride, polyvinylidene chloride, polyvinylalcohol polyvinylacetal, polyacrylate, polystyrene, polyvinylacetate, and the like, as well as copolymers consisting of monomers thereof capable of copolymerization.

In general, the laminate having more highly glossy surface is obtained according to the present invention by the use of B-film having a softening point higher than the temperature used in the heating step of the procedures. On the other hand, the lower glossy one is obtained by the use of film having a softening point lower than the same. Thus, a laminate having a desired glossy surface can be obtained by selecting the B-film. It goes without saying that the B-film may be mat for the purpose.

There are many embodiments in the present invention for producing a mat laminate. A laminate having a desirable pattern on its surface may be produced by selecting either the sorts of the sheet to be impregnated with resin or B-films to which various uneven patterns have been applied. In the use of such B-film, the higher the softening point and the less the elongation under heating of the B-film are, the more responsibly the pattern on the surface of the yielding laminate reveals. The gloss of the laminate obtained when a B-film having a softening point much higher than the heating temperature is used, is higher than that of the laminate obtained when a B-film having a softening point nearly equal to heating temperatures is used.

The application of the uneven pattern to the B-film may be achieved by the conventional method such as passing the film through a roller for embossing under pressure, and if necessary, heating or molding the original resin in a mold having a corresponding pattern.

In another embodiment of the present invention, another thing for applying the pattern may be used together with the B-film. For instance, a laminate having a netlike pattern may be produced by putting a wire net on the outside of the B-film and, following the lamination, removing the wire net. In place of the wire net, fabrics of natural or synthetic fiber, asbestos and, glass fiber may be used for such purpose.

In further another embodiment, the B-film may be integrated with such other things as the fabrics and paper for producing the laminate having patterns according to the present invention. Such a B-film may be produced, for example, by impregnating or applying a varnish of the thermoplastic resin to the paper or cloth, evaporating the solvent in varnish, if necessary, and applying pressure and heat, if necessary, to the impregnated paper of cloth between two embossed caul plates to form the desired pattern thereon. The B-film integrated with the paper or cloth can be used in the present invention.

As seen from the disclosures, it will be desirable that the relation of temperatures each of softening point of A-film (represented by $T_1$), decomposition temperature of peroxide ($T_2$), applying temperature during the heating step ($T_3$) and softening point of B-film ($T_4$), satisfy the following formula $$T_1 \leq T_2 < T_3 \leq T_4$$

wherein the symbols are referred to above.

The method according to the present invention provides both glossy laminate and mat laminate which are suitable for the material of upholstery, electric instrument and inner plate of vehicles and house, especially for decorative plate.

The present invention will be more clearly illustrated by the following Examples which should not limit the present invention defined in the attached claims. The parts mentioned therein are by weight.

The crosscut test referred to therein is explained as follows:

FIGS. 1 and 2 are schematic FIGS. illustrating the testing apparatus;

FIG. 1 shows a schematic side view of the test apparatus. A test specimen is set on the table of the machine with the layer of the resin-impregnated sheet upward, and given by means of a razor blade straight scratches at 2 mm. intervals, each crossing each other at right angle, which reach to the metal plate, so as to form 100 squares. A piece of pressure-sensitive or tacky tape is pressed to adhere thereon in the length of 20 mm. thereon, and the remainder of the tape is also allowed to adhere a suitable fixing plate. The plate is pulled upward at an angle of 45° with the specimen by a load of 500 g. connected therewith through a fixed pulley and hanging over 20 cm. of the lying specimen. The number of the squares removed from the metal plate of the specimen is enumerated. The less the number is, the stronger the adhesive force becomes.

The test of hardness against scratches is explained as follows:

As seen from FIG. 2, a hardness tester resembling that of Martin but having diamond needle whose vertical angle is 45° is used under variable loads to scratch the surface of the specimen in the length of 5 cm. The load is counted when the width and length of the scratch conforms to a series of standards which is obtained from the surface of a slide glass for microscope passing the test of Japanese Industrial Standard R–3707 through the hardness test by means of the same hardness tester under the load of 420 g.

Other tests for heat resistance, hot water resistance, discoloration resistance and flammability are carried out by Japanese Industrial Standards K–6902, K–6902, K6902 and K6744, respectively.

Example 1

A. 93 Parts of diallyl phthalate prepolymer, 7 parts of diallyl phthalate and 2 parts of benzoyl peroxide are dissolved in 150 parts of acetone. A sheet of diallyl phthalate resin-impregnated paper was prepared by impregnating with the solution a sheet of printed decorative paper having 80 g./m.$^2$ as basis weight and drying. A polyethylene film having a thickness of 50 microns was placed on a corrosion-resistant alloyed aluminum plate having a thickness of 0.8 mm. and the resin-impregnated paper was put on the polyethylene film. The assembly was heated at a temperature of 125° C. under a pressure of 12 kg./cm.$^2$ between two caul plates for 10 minutes, and allowed to cool.

A diallyl phthalate resin-decorative laminate supported by the corrosion resistant alloyed aluminum plate was thus produced. The properties of the obtained decorative plate are shown in the following Table I. From the Table, the heat-resistance, hot water-resistance, and discoloration resistance as well as adherence against punching of the decorative laminate are excellent.

Table I

| Properties | Test Method | Result |
|---|---|---|
| Heat-resistance | JIS K–6902 | No change |
| Hot | JIS K–6902 | No change |
| Discoloration resistance | JIS K–6902 | No change |
| Flammability | JIS K–6744 | Extinguished promptly |
| Punching | By press for punching | Good |
| Adherence | Cross-cutting test | No peeling |

B. The procedures as described in the above Example were repeated with exception that a polyethylene film was put on the resin-impregnated paper and removed after the completion of the procedures. A mat, decorative laminate of diallyl phthalate resin supported by corrosion-resistant alloyed aluminum plate, was thus produced.

Example 2

A. 75 Parts of an unsaturated polyester resin having an acid number of 20 prepared from phthalic anhydride, maleic anhydride and diethylene glycol by conventional method, 25 parts of diallyl phthalate and 3 parts of a solution containing methyl ethyl ketone peroxide in an amount of 50 percent by weight are mixed in the presence of 50 parts of acetone while agitating. The thus obtained mixture was applied to a nonwoven cloth weighing 30 g./m.² as basis weight of acrylic synthetic fiber having a size of 30 g./m.², which has been printed, and obtained unsaturated polyester resin impregnated sheet having 60 percent resin content after impregnating.

An unsaturated polyester resin-laminated glossy laminate supported by a steel plate was produced by putting as the A-film a film having a thickness of 50 microns of ethylene-vinyl acetate copolymer containing the latter monomer in an amount of 4 mole percent by weight, upon a steel plate having a thickness of 0.3 mm. which has been subjected to degreasing, further placing on the A-film the resin-impregnated sheet of nonwoven cloth, and heating at a temperature of 140° C. under pressure of 6 kg./cm.² for 10 minutes the thus prepared assembly between two caul plates, and removed after cooling.

The results of the tests for the laminate showed excellent properties, as shown in the following Table II.

Table II

| Property | Test method | Result |
| --- | --- | --- |
| Punching | By press for punching | Good |
| Bending | Winding around metal pipe | Possible to radius of 2 mm |
| Heat-resistance | 140° C.–5 hrs. | No change |
| Adhesion | Crosscut test | No peeling |

B. The procedures as described in the above Example were repeated with exception that a polyvinyl alcohol film was placed on the unsaturated polyester-impregnated sheet as the B-film and removed after the completion of the procedures. A mat laminate whose properties were same as in the laminate obtained in the above Example was produced.

Example 3

A. 90 Parts of diallyl phthalate prepolymer, 10 parts of diallyl phthalate and 3 parts of tert.-butyl perbenzoate were dissolved in 100 parts of methyl ethyl ketone. A paper containing pigment was impregnated with the diallyl phthalate resin solution and dried.

A diallyl phthalate resin-decorative laminate was produced by inserting a polypropylene film having a thickness of 25 microns into between the resin-impregnated paper and corrosion-resistively alloyed aluminum plate having a thickness of 1.2 mm., integrating the assembly by heating at 160° C. under pressure of 20 kg./cm.² between two caul plates and cooling. The thus obtained decorative laminate is of excellent heat-resistance and processability as shown in Table III.

Table III

| Property | Test method | Result |
| --- | --- | --- |
| Heat-resistance | 170° C–4 hrs. | No change |
| Cutting | By shearing machine | No change |
| Punching | By press for punching | Good |
| Drilling | By drills | Good |
| Scratch Hardness | By diamond needle | Load 100 g. |

B. The procedures described in the above Example were repeated with exception that a polyethylene terephthalate film having uneven pattern thereon was placed on the resin-impregnated paper and removed after the completion of the procedures. A decorative plate having uneven pattern on its surface was produced.

Example 4

An unsaturated polyester resin having a softening point of 65° C. was prepared according to the conventional method by condensing 1,000 g. of iso-phthalic acid, 465 g. of maleic anhydride and 800 g. of ethylene gylcol in the atmosphere of nitrogen.

An unsaturated polyester resin-impregnated paper containing benzoyl peroxide was produced by dissolving 95 parts of the unsaturated polyester resin, 25 parts of diallyl phthalate and 4 parts of benzoyl peroxide in 120 parts of acetone, and impregnating a pigment-containing paper having 80 g./m.² as basis weight with the solution and drying.

An unsaturated resin-laminated steel decorative plate was produced by placing as A-film a polyethylene film having a thickness of 20 microns on a steel pannel having a thickness of 0.8 mm. and having been degreased, further placing on the polyethylene film the resin-impregnated paper, and integrating the thus prepared assembly by heating at a temperature of 125° C. under pressure of 10 kg./cm² for 25 minutes between two caul plates and cooling.

As shown in Tables IV, the obtained decorative plate has excellent properties.

Table Iv

| Property | Test method | Result |
| --- | --- | --- |
| Heat-resistance | JIS K–6902 | No change |
| Hot water-resistance | JIS K–6902 | No change |
| Boiling water-resistance | 4 hrs. in boiling water | No change |
| Cutting | Cutting by shearing machine | Good |
| Punching | By press for punching | Good |
| Adherence | Crosscut test | No peeling |

B. The procedures described in the above Example were repeated excepting no use of the polyethylene film as the A-film. The yielding decorative plate shown inferior property in the punching test, showing the delamination at the edge of surface subjected to punch.

Example 5

A diallyl phthalate resin-impregnated sheet was prepared by impregnating a printed acrylic type nonwoven cloth of 30 g./m.² with a solution of 93 parts of diallyl phthalate prepolymer, 7 parts of diallyl phthalate and 2 parts of benzoyl peroxide in 150 parts of acetone, in such an resin content as to reach 70 percent by weight of the obtained impregnated sheet.

A steel pannel having a thickness of 0.3 mm. and having been degreased was applied with a solution of 1 part of benzoyl peroxide, 10 parts of maleic anhydride in a mixture of 15 parts of toluene and 65 parts of acetone and dried to obtain the pannel coated with a mixture of benzoyl peroxide and maleic anhydride.

A diallyl phthalate resin-laminated steel decorative plate was produced by placing a rigid polyvinyl chloride film having a thickness of 50 microns as the A-film on the treated surface of the pannel, further placing thereon the diallyl phthalate resin-impregnated sheet, integrating the assembly by heating at a temperature of 135° C. under pressure of 20 kg./cm.² for 20 minutes between two caul plates and cooling.

The thus obtained decorative laminate has excellent properties, as shown in the following Table V.

Table V

| Property | Test method | Result |
| --- | --- | --- |
| Punching | By press for punching | Good |
| Bending | Winding on pipe | Possible t0 5 mm. diameter |

| Adherence | Crosscut test | No peeling |

B. The procedures described in the above Example were repeated with exception that a polypropylene film was put on the diallyl phthalate resin-impregnated sheet and removed after completion of the procedures. A mat diallyl phthalate-laminated steel decorative plate was produced.

Example 6

A 10 percent solution of tert.-butyl perbenzoate in acetone was sprayed on the unprinted side of a melamine- impregnated sheet for decorative plate to coat the sheet with the peroxide.

A melamine-impregnated decorative laminate was produced by placing a polypropylene film having a thickness of 25 microns on a corrosion-resistively alloyed aluminum pannel having a thickness of 1.2 mm. and having been applied with a 3 percent solution of oxallic acid in methanol, further placing the melamine-impregnated sheet on the film, integrating the assembly by heating at a temperature of 165° C. under pressure of 120 kg./cm.$^2$ for 30 minutes and cooling.

The produced decorative plate has excellent properties in scratch hardness, heat-resistance, discoloring resistance, peeling resistance against punching and cutting, as shown in the following Table VI.

Table VI

| Property | Test method | Result |
| --- | --- | --- |
| Scratch hardness | By diamond needle | 200 g. |
| Heat-resistance | JIS K-6902 | No change |
| Discoloring resistance | JIS K-6902 | No change |
| Punching | By pressing for punching | Good |
| Cutting | By shearing machine | Good |

B. The procedures described in the above Example were repeated with exception that spraying the tert.-butyl perbenzoate solution was omitted.

The yielding decorative laminate is poor in adhesion between the metal and polypropylene film, showing peeling off therebetween with ease in the cross-cut test.

C. The procedures described in above Example (A) were repeated with exception that a polyethylene terephthalate film having a thickness of 20 microns was placed on the outside of the melamine resin-impregnated sheet and removed after the completion of the procedures.

A unique semiglossy decorative plate was thus produced.

What we claim is:

1. In a process for producing a laminate of a metal support and a cured thermosetting layer by heating together under pressure (1) a metal plate or foil and (2) a thermosetting resin-impregnated sheet thereon to effect lamination therebetween, the improvement which comprises interposing (3) a first self-supporting thin film of a thermoplastic resin between the thermosetting resin-impregnated sheet and the metal plate, putting upon the resin-impregnated sheet (4) a second film of a thermoplastic resin having a softening point higher than that of the first film, and then heating the resulting assembly under pressure at a temperature no greater than the softening point of the second film and higher than the softening point of the first film in the presence of an activating agent selected from the group consisting of a peroxide, a mixture of the peroxide and an organic acid and a mixture of the peroxide and an anhydride, said activating agent having a decomposition temperature lower than said heating temperature and no less than the softening point of the first film and being located in the thermosetting resin-impregnated sheet or on its surface or on the surface of the metal plate or foil facing the first film.

2. The process according to claim 1, wherein the activating agent is present in the thermosetting resin-impregnated paper, and the thickness of the first film is less than 0.05 mm.

3. The process according to claim 1, wherein the first film is of polyethylene.

4. The process according to claim 1, wherein the first film is of polypropylene.

5. The process according to claim 1, wherein the first film is of a copolymer containing olefinic structure unit.

6. The process according to claim 1, wherein the first film is of polyvinyl chloride.

7. The process according to claim 1, wherein the first film is of a mixture of at least two thermoplastic polymers.

8. The process according to claim 2, wherein the first film is of polyethylene and the second film is of polypropylene.

9. The process according to claim 1, which comprises a further step of removing the second film from the laminate.

10. The process according to claim 1, wherein the second film is provided with uneven pattern thereon.

11. A laminate consisting essentially of (1) a metal plate or foil and (2) a cured thermosetting resin-impregnated paper, with (3) a thermoplastic resin film of thin uniform thickness therebetween and (4) a second thermoplastic resin film being lightly adhered to (2) said resin-impregnated paper to such an extent that it can easily be removed by hand therefrom, while said (1) metal plate or foil and said (2) resin-impregnated paper are firmly bonded by means of said intermediary (3) resin film, said laminate being formed by the process of claim 13.